United States Patent [19]
Carter, II

[11] Patent Number: 4,922,431
[45] Date of Patent: May 1, 1990

[54] METHOD AND APPARATUS OF TOOL CONTROL IN ARBITRARY PLANE OPERATIONS

[75] Inventor: Woodward C. Carter, II, Maitland, Fla.

[73] Assignee: Automation Intelligence, Inc., Orlando, Fla.

[21] Appl. No.: 271,943

[22] Filed: Nov. 16, 1988

[51] Int. Cl.⁵ .......................................... G05B 19/403
[52] U.S. Cl. ............................... 364/474.18; 318/572; 364/474.29; 364/474.35
[58] Field of Search ....................... 364/474.17, 474.18, 364/474.28, 474.29, 474.35, 191–193; 318/571, 572, 568.1

[56] References Cited

U.S. PATENT DOCUMENTS

| | | | |
|---|---|---|---|
| 4,608,645 | 8/1986 | Niwa et al. | 364/474.18 |
| 4,659,265 | 4/1987 | Kishi et al. | 364/474.18 X |
| 4,789,931 | 12/1988 | Kuragano et al. | 364/474.18 |

Primary Examiner—Joseph Ruggiero
Attorney, Agent, or Firm—MacDonald J. Wiggins

[57] ABSTRACT

A method and apparatus for computerized numerical control of machine tools includes a computer program and a controller for establishing an arbitrary plane with respect to the principal planes for providing cutter radius compensation. The processor precalculates structured data portions of the program that affect motion of the cutter. The precalculated data is stored and, in coordination with other inputs, is utilized to control machine tool servo drives to provide a "determine position loop error" function.

7 Claims, 3 Drawing Sheets

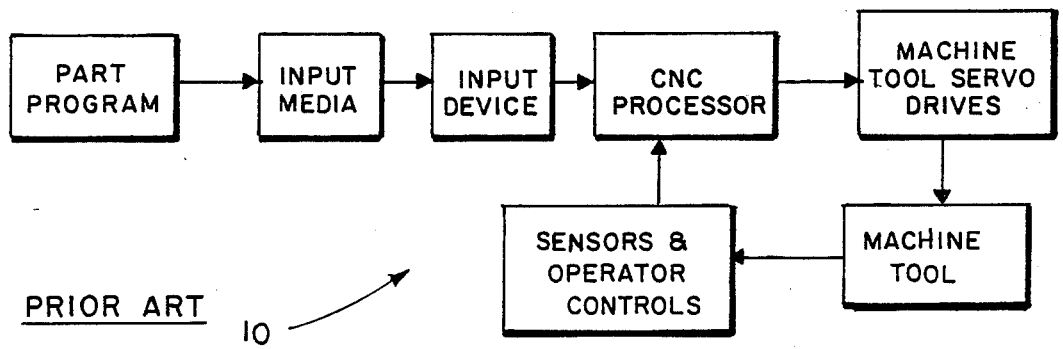
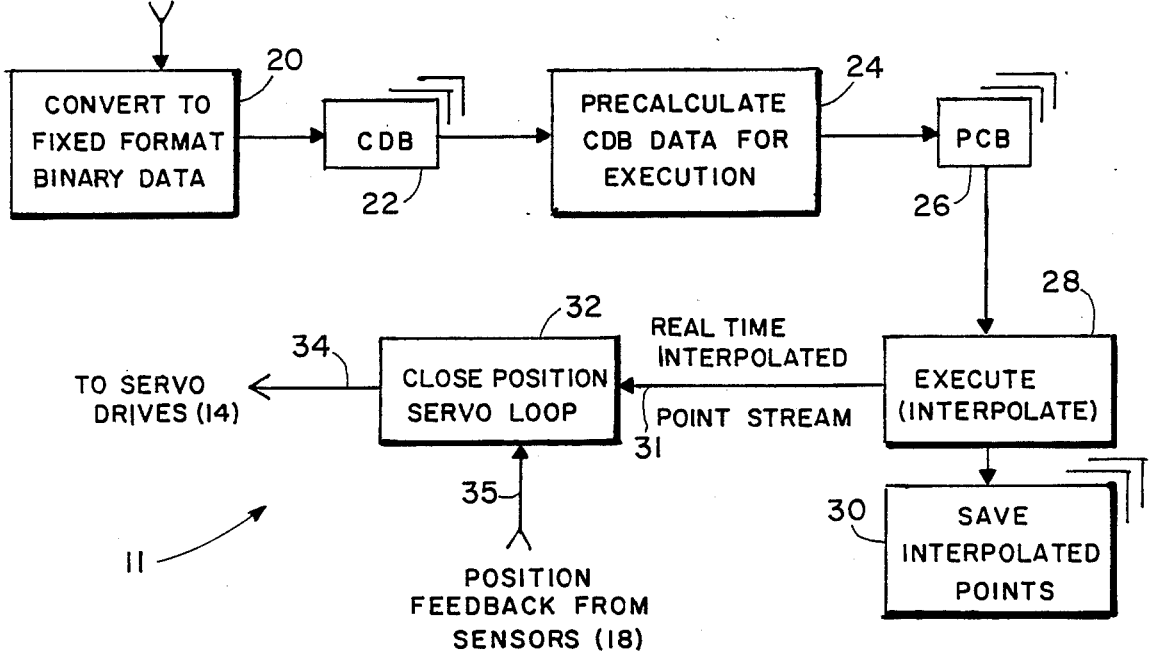

METHOD AND APPARATUS OF TOOL CONTROL IN ARBITRARY PLANE OPERATIONS

BACKGROUND OF THE INVENTION

1. Field of the Invention

The present invention relates to methods of computerized numerical control of machine tools, and more particularly to a method of controlling a tool to move in an arbitrary plane.

2. Description of the Prior Art

Machine tools and similar apparatus may be controlled by computerized numerical controllers (CNC). In the prior art, CNCs operate by controlling a tool movement in a series of straight lines in space and in circular arcs in a plane. The CNC is directed by a computer program and a plane of operation is then selected by the computer programmer. In prior art systems, the plane has generally been limited to one of the "principal planes". That is, by xy, zx, and yz planes in a three dimensional rectangular coordinate system.

The EIA standard RS-274 program language includes constructs or "g codes" for selecting the principal planes. The plane selection is used in the CNC to determine the plane in which circular arcs and other planar curves are to be produced. Also, the plane in which cutter radius compensation (CRC) is to be applied is so selected, and the programmer will assume a certain size cutter. If a resharpened cutter is used, adjustments to the control are required and knowledge of a plane in which to apply CRC is necessary.

Plane selection is also necessary in determining the meaning of statements such as "the tool is to the left of the part it is cutting" since the data always assumes the point of reference is that of a person positioned within the CRC plane looking in the direction of the relative motion of the tool with respect to the part being cut.

Through the use of computer graphics, it is now possible for a CNC to display three dimensional images of the path along which a tool is being moved. Also, improvements in machine tool technology have produced axis configurations that make it possible to perform operations in an arbitrary plane that were earlier possible only in a principal plane. Thus, a method and system is required to provide cutter compensation and circular arc generation in an arbitrary plane. Preferably, programming should utilize RS-274 and be as similar as possible to that used in principal plane operations.

SUMMARY OF THE INVENTION

The present invention includes a method of circular arc generation and CRC implementation in an arbitrary plane using methods utilized in a principal plane. The method is combined with existing CNC architecture and hardware to solve the above noted problems of the prior art.

A computer program, preferably in the EIA RS-274D format, describing the actions to be executed by the CNC, is entered into the CNC processor. The processor is connected to control servo motor drives and related devices that control a machine tool. Sensors and operator controls associated with the machine operations provide feedback and information to the CNC processor.

The CNC processor is preferably implemented using microprocessors, although discrete hardware logic or minicomputers can be used. A block of data from the computer program input device is processed by the CNC processor to fixed format binary data, referred to as a "convert" function. The result is stored in converted data buffers (CDB's). Next, the processor precalculates the structured data portions, that affect motion from the buffers, into an expanded format suitable for execution and coordination with other CNC functions. The result is stored in precalculated data buffers (PCB's).

The PCB structure is used iteratively and in conjunction with other coordination devices to produce outputs to the servo drives or other motion producing devices. This process is referred to as a "determine position loop error" (DPE) function.

Therefore, it is a principal object of the invention to provide apparatus and method for circular arc generation and tool cutter radius compensation in an arbitrary plane of a numerical machine tool control system.

It is anther object of the invention to combine software implementations of control functions with existing computerized numerical controllers to provide more accurate and flexible machine tool control systems.

These and other objects and advantages of the invention will become apparent from the following detailed description when read in conjunction with the drawings.

BRIEF DESCRIPTION OF THE DRAWINGS

FIG. 1 is a block diagram of a prior art computerized numerical controller;

FIG. 2 is a functional block diagram and flow chart of a processor in accordance with the invention;

DETAILED DESCRIPTION OF THE PREFERRED EMBODIMENT

Figure 3:
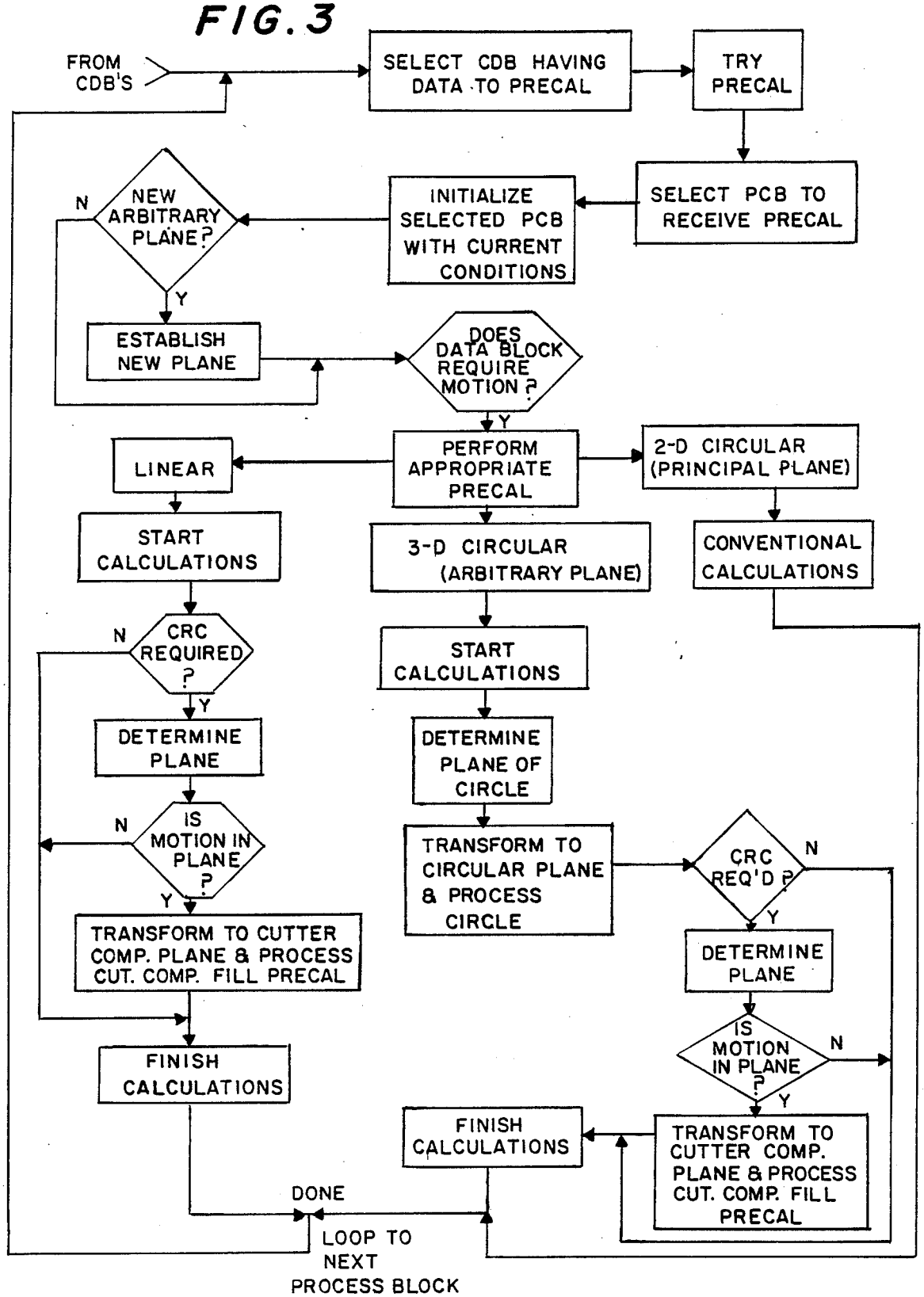
FIG. 3 is a flow chart of the precalculation function of FIG. 2.

In the detailed description of the preferred embodiment, the following acronyms, which are known in the art, will be used:

CNC computerized numerical controller;
CRC cutter radius compensation;
RS-274D EIA programming standard;
BLOCK analogous to a single program line in a computer language;
CONVERT the function of processing a block into a format with more structure than the original input;
CDB converted data buffer for storing the converted blocks;
PRECAL a precalculation function that processes data from a CDB into an expanded format suitable for execution with and coordination with other CNC functions;
PCB precalculated data buffer; and
DPE a determine position loop error function.

Referring to FIG. 1, a block diagram of a generic prior art CNC 10 is shown. A part program is prepared in a format suitable to the system, utilizing, for example, the EIA RS-274 programming standard. The input media required by the CNC processor 12, such as punched tape, is prepared to read the part program into CNC processor 12 via a suitable input device. The program describes the actions to be performed by machine tool 16. The CNC processor acts on the input commands to control machine tool servo motor drives 14 and other devices which control machine tool 16. Sensors and other input and output devices (which include operator controls) associated with machine tool 16 provide feedback to CNC processor 12.

The present invention relates to CNC processor 12 as will be described hereinafter. The CNC processor 12 may be implemented with discrete hardware logic, with the use of minicomputers, or with microprocessors. However, the preferred embodiment of the invention utilizes a multiple microprocessor based implementation and will be disclosed in terms of programs operating on a microprocessor based CNC.

A CNC 11 in accordance with the invention is shown in functional form in FIG. 2. The part program from the input device is converted to fixed format binary data by reading a BLOCK of data and processing the data into a format having more structure than the original data, referred to as the CONVERT function 20.

The converted data is stored in CDB's 22. CNC processor 11 next processes (precalculates) 24 the structured data from CDB's 22 that affect motion of the machine tool into an expanded form suitable for eventual execution. These data must be coordinated with other CNC functions prior to execution of a motion command. The PRECAL data is stored in PCB's 26.

The PRECAL function 24 of the CNC processor is used repetitively and with other coordination inputs to produce a desired trajectory of motion. This process is referred to as motion execution 28 or interpolation. A specific trajectory may also be saved for other uses, such as plotting. The real time interpolated point stream on buss 31, which defines the desired trajectory and the actual trajectory information feedback 18 closes the position servo loop 32 to produce outputs 34 to servo drives 14. This process is called the "close position loop" or DPE function.

The PRECAL function 24 is described in detail with reference to FIG. 3. This function continually searches the CDB's to select a CDB requiring processing. A PCB is selected to receive processed data and PRECAL function 24 initially sets up the selected PCB based on currently existing conditions. If found necessary from the processed CDB data, a new arbitrary plane is established. As will be recognized, the invention advantageously permits the new arbitrary plane to be established, a function not available in prior art systems which are limited to the principal plane or special geometries.

Assuming that the data block requires motion, such motion may be linear motion, circular motion in an arbitrary plane (3D), or circular motion in a principal arbitrary plane (2D). If the required motion is linear, CRC may be required in an arbitrary plane. Thus, the PRECAL function proceeds and determines if CRC is required. If so, the arbitrary plane and the necessity for motion in that plane is determined. The data is then transformed to the cutter compensation arbitrary plane and the precalculation performed. Generally, the required motion can include a "fill" move due to CRC requirements which is added by the PRECAL function. At this point, the calculations are completed and the data stored in the selected PCB.

When the motion is 2-D circular (principal plane), the calculations are conventional. 3-D circular motion requires an arbitrary plane. The PRECAL function determines the arbitrary plane and transforms the data to that plane, processing the circle in that plane. The remainder of the calculations are the same as those for linear motion described above.

Figure 4:
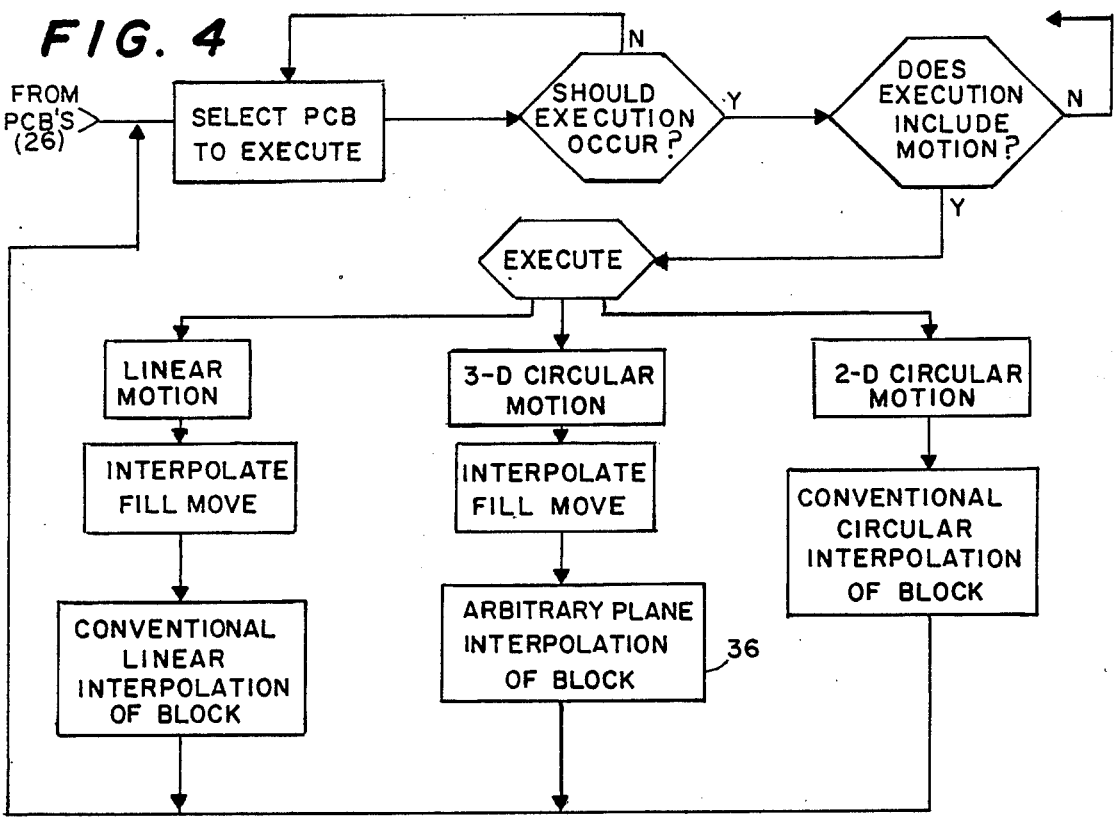
FIG. 4 is a flow chart of the execution function of FIG. 3.

FIG. 4 illustrates in more detail the execute-interpolate function 28 of FIG. 2. When a PCB is selected to execute and that execution involves motion, one of the three possible motion modes shown in FIG. 3 will be required. If a "fill" move has been programmed and added to the data in the PCB by the PRECAL function, the fill move may be in an arbitrary plane in a block with a linear move or a 3-D circular move. Thus, either situation requires the capabilities of the invention. The 2-D circular motion case utilizes conventional circular interpolation of the block. The arbitrary plane interpolation function 36 may be recognized as a significant aspect of the invention and will be discussed with reference to FIG. 5. The discussion will also apply to the "fills" between linear moves described above.

Figure 5:
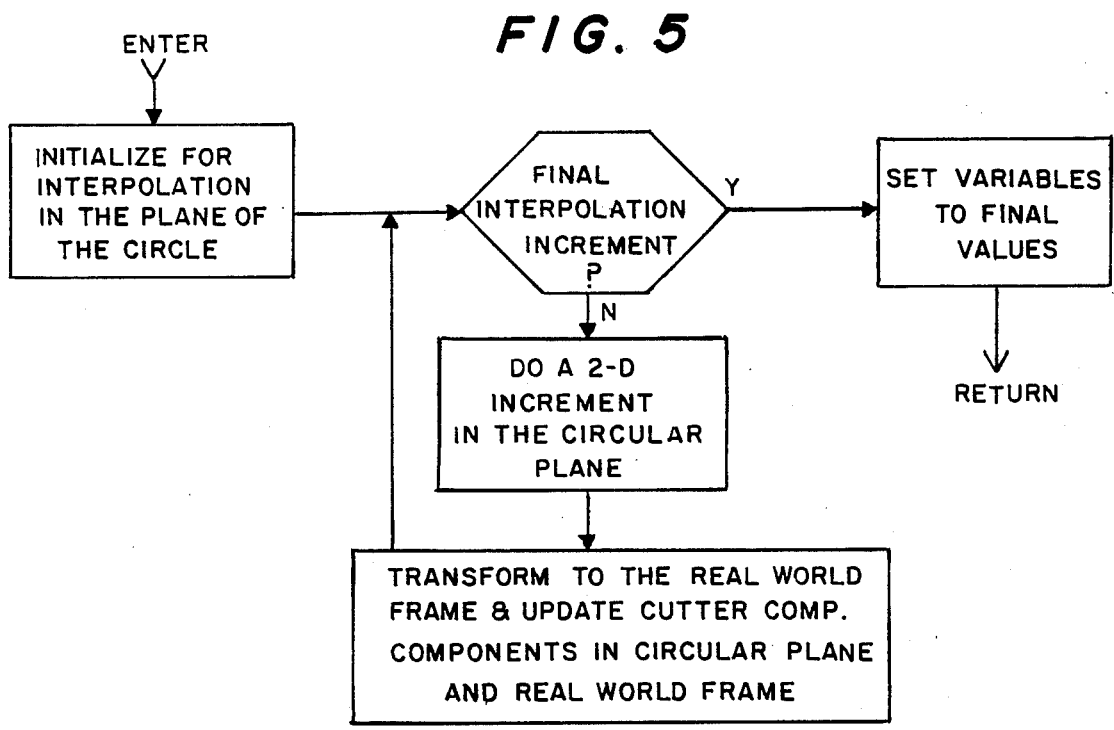
FIG. 5 is a flow chart of the transformation function of FIG. 3.

When referring to FIG. 5, the purpose of the precalculations of FIG. 3 and of certain CONVERT processes of FIG. 2, are to provide data for the arbitrary plane interpolation processes. The necessary data at the process input have been developed by the PRECAL function and these data are first initialized. If the interpolation increment is the last in the block, the proper final values, as provided by the PRECAL function, of the pertinent values are set. If not, a 2-D interpolation in the plane of the circle is made using standard 2-D techniques are required. The increment is then transformed, in accordance with the invention, to relate the interpolated results in the arbitrary circular plane to the actual "real world" frame of reference. Supplemental calculations in both the real world frame of reference and circular plane reference frames are made to keep the data current. Such supplemental calculations determine current velocity vectors and CRC components in both frames.

As will now be understood, the method of the invention includes the following steps:
  1. Mapping of three dimensional functions by selection of a standard plane;
  2. Transformation of operating data into the standard plane environment;
  3. Implementation of transformed data in the standard plane environment; and
  4. Transformation of the implemented function into the original three dimensional environment.

Having described the method of the invention, details of the programs necessary to practice the method will now be described.

An appropriate standard plane is one such that if the 3D function is mapped to the standard plane environment, then that function can be implemented in that environment. For circular arcs, the standard plane is the plane of the arc; for CRC operations it is usually the plane formed by the 2 edges of the part being cut (the "workpiece") that are most local to the cutter and is the plane of the workpiece when the workpiece is idealized into a plane. Often the standard plane is dictated by the position of auxiliary machine axes (axes other than the basic x, y, and z axes) which orient the cutter so that it can operate in planes other than the principal planes.

The selection of an appropriate standard plane is modal and stays selected until a different one is selected. Such selection can be performed in several ways:
  1. By programming a g72/73 three dimensional circular interpolation block. This method resolves the ambiguity of which side of the plane is the reference side for concepts such as clockwise/counterclockwise and tool left/right of the workpiece by the g72 (clockwise) /g73 (counterclockwise) convention of viewing the arc after the x, y, and z axes origin has been translated to the arc center and looking toward the origin down the line that evenly splits the first octant in which x, y, and z are all positive. The first octant split line is the one that makes equal angles with the positive x, y and z axes. The shorter arc of the two possibilities is used if the arc, when so viewed, appears as a line indicating the arc is in a plane that also contains the 1st octant splitting line. In practice, this involves a comparison of the angle between the first octant splitting line and either of the two possible normals to the standard circular plane, both the splitting line and the normal being considered as directed lines from the origin.

2. By adding plane selection functions to the RS-274 language using unused codes reserved for user defined purposes. For instance, a. g29 xyz uvw ijk could define a plane passing through points (x,y,z), (u,v,w), & (i,j,k) whose normal, when the original was translated to be contained in that plane, made an angle $>-90$ degrees and $<+90$ degrees with the 1st octant split line, and b. g28 xyz uvw ijk could define a plane passing through points (x,y,z), (u,v,w), and (i,j,k) whose normal, when the origin was translated to be contained in that plane, made an angle $<-90$ degrees or $>+90$ degrees with the 1st octant splint line.

3. By knowledge of the machine configuration and by making the plane selection a function of the programmed position of the axes whose position determines the cutting capabilities of the machine. Consider a machine tool with x, y, z axes and with an additional b axis rotating about z in the xy plane. By convention, the z axis is chosen so that the tool points along the z axis in the minus z direction with all axes at some reference position. If the b and c axes rotation is monitored, the CNC could continually determine the plane to which the tool was normal; this plane becomes the standard plane.

A standard plane having been established, the disclosed solution uses a standard algorithm for transforming from the real world coordinates (represented by x, y, z) to standard plane coordinates (represented by xc, yc, zc or xn, yn, zn). The algorithm is arbitrary and is selected to permit the CNC to perform the intended task in the xc yc zc frame of reference. The algorithm may be adjusted sometimes to make the xc yc zc frame appear natural in some sense. One algorithm is:

1. Translate the x y z real world axes to a point which is the natural center for the operation the CNC is to perform in the standard plane. For a circular arc, the natural center would be the arc center; for circular fill at a corner with CRC active, the natural center would be the programmed corner without CRC. X, y, z in the following refer to the translated frame; the standard plane is taken to contain the origin of the translated frame; and the standard plane normal is taken at the origin of the translated frame.

2. Rotate the +x axis in the xy plane about z until the +x axis lines up with the projection on the xy plane of the normal to the standard plane. A frame xr yr z is obtained where "r" indicates "rotated". The normal will be in the z xr plane. This rotation is called R1; the reverse rotation is called R1i, since it is the inverse of R1.

3. Rotate the +z axis in the z xr plane about yr until the +z axis lines up with the normal to the standard plane. This rotation is called R2; the reverse rotation is called R2i, since it is the inverse of R2.

4. The operation of R1 followed by R2 produces a frame xrr yr zr which is called frame xc yc zc or xn yn zn. In this frame xn yn are in the standard plane and zn is normal to it. Concepts like CW, CCW, tool left, and tool right are unambiguous in this plane and conventional two dimensional techniques for interpolation and CRC sign determination can be applied. Other data in this frame of reference (such as the current velocity vector direction and its perpendicular mate, the current normal to the programmed surface) and the current cutter radius offset components can be calculated and saved with less effort than in the real world should it be required for use due to unforseeable real time changes in conditions. The ability to perform this operation with minimal computational cost, due to the two dimensional nature of standard plane operations permits capabilities such as a. Turning CRC on and off as required. With a standard plane established and the last velocity (motion) vector direction remembered, the CNC can always determine the vector directions in the standard plane and normal to the last motion direction and are the directions in which motion is implemented to turn CRC on and off.

b. Controlling additional axes so that they remain perpendicular to the program surface. CNC's are also used to control electron beam welder and flame/plasma arc cutters; in these devices the orientation of the cutting head with respect to the cutting surface is important. Being able to determine the vector directions in the standard plane that are normal to the motion vector permits control of that orientation.

5. The operation of R1 followed by R2 is denoted by R2R1 where R2 and R1 may be thought of as transformation matrices derived from angles 2 and 1 respectively in the expression.

$$\begin{array}{c} xn \\ yn \\ zn \end{array} = [R2R1] \begin{array}{c} x \\ y \\ z \end{array}$$

where the intent is to show a column vector equal to a matrix R2R1 times a column vector, and the non-commutativity of matrix multiplication is honored.

6. Following an operation in the standard plane on xn yn zn, an inverse transformation is performed back to the translated real world frame. The inverse operation is $$\begin{array}{c} x \\ y \\ z \end{array} = [R1iR2i] \begin{array}{c} xn \\ yn \\ zn \end{array}$$

7. Other operations may be performed on the newly calculated x y z, such as rotational axis offsets, and thereafter x y z being translated back to its true real world origin for implementation by the control.

8. In conventional principal plane operations it is intuitively satisfying if a. when xy is the principal plane xn yn zn=x y z;

b. when zx is the principal plane xn yn zn=z x y;

c. when yz is the principal plane xn yn zn=y z x;

since standard plane operations are done in xn yn. The above described R1 and R2 do not give this result. This result can be achieved with a third rotation applied after R1 and R2, where R3 is a. not required when xy is the principal plane;
b. 180 degrees when zx is the principal plane;
c. 90 degrees when yz is the principal plane;

Since the R3R2R1 and R1iR2iR3i transformations are time consuming and are, in the principal plane cases, composed of ones and zeroes, it is faster to explicity watch for the principal plane cases and use codes dedicated to these special but very frequently used cases.

The PRECAL function in a CNC is used to calculate as much data as possible ahead of time to speed the maximum rate at which the system is able to get data from the RS-274 repository to the execution state. The transformation matrices to and from the standard plane are able to be calculated in PRECAL ahead of time since they depend only on data in the program stream and not on realtime or interative data such as is developed in interpolation algorithms. This reduces the amount of trigonometry required in the real time interpolation algorithms and makes the method more practical.

As will now be recognized, a method has been disclosed which can be used in existing CNC architectures to extend that CNC's capabilities in the principal planes to arbitrary planes while the capabilities remain planar.

Although specific steps of the method have been disclosed for exemplary purposes, many variations may be made without departing from the spirit and scope of the invention.

I claim:

1. A method of controlling a cutting tool to move in an arbitrary plane utilizing a computerized numerical controller having a computer program input device, a processor, machine tool servo drives, a cutting tool, and sensor and operator controls, comprising the steps of:
   (a) processing a block of data from the computer program input device to fixed format binary data;
   (b) storing the fixed format binary data in converted data buffers;
   (c) precalculating into an expanded form the data from the converted data buffers that affect motion of the machine tool, said precalculation including establishment of a new cutter compensation arbitrary plane;
   (d) storing the precalculated data;
   (e) repeating step (c) in coordination with additional inputs from the converted data buffers to produce a trajectory of motion;
   (f) producing a real time data stream from the stored precalculated data defining the trajectory; and
   (g) combining the real time data stream with feedback data from machine tool position sensors to produce outputs to the servo drives.

2. The method as recited in claim 1 in which step (c) includes the steps of:
   (a) selecting a converted data buffer having data to be precalculated;
   (i) transforming the expanded form data to the established arbitrary plane.

3. The method as recited in claim 2 in which step (f) includes the steps of:
   (j) interpolating the block of data in the arbitrary plane.

4. The method as recited in claim 3 in which step (j) includes the steps of:
   (k) initializing the data for interpolation in the plane of a circle in the arbitrary plane;
   (l) transforming the initialized data to a real world frame of reference; and
   (m) updating the cutter compensation components of the data in the circular plane and the real world frame of reference.

5. A method of circular arc generation and cutter radius compensation in an arbitrary plane utilizing a computerized numerical controller having
   (i) a computer,
   (ii) a computer program input device,
   (iii) a data processor,
   (iv) machine tool servo drives for moving a machine tool,
   (v) cutting tool position sensors, and
   (vi) operator controls, comprising the steps of:
   (a) processing blocks of data from the computer program input device to a fixed binary data format;
   (b) storing fixed format binary data in converted data buffers;
   (c) selecting successive converted data buffers having data to be precalculated;
   (d) precalculating into an expanded form, data from the selected buffers that affect motion of the machine tool including establishment of a new cutter compensation arbitrary plane;
   (e) transforming the expanded form data to the established arbitrary plane;
   (f) storing the precalculated and transformed data;
   (g) repeating steps (c) through (f) in coordination with additional inputs from the converted data buffers to produce a trajectory of motion;
   (h) producing a real time data stream from the stored precalculated data defining the trajectory; and
   (i) combining the real time data stream with feedback data from cutting tool position sensors to produce outputs to the machine tool servo drives.

6. The method as recited in claim 5 in which step (h) includes the steps of:
   (i) initializing the data for interpolation in the plane of a circle in the arbitrary plane;
   (j) interpolating the block of data in the arbitrary plane;
   (k) transforming the initialized data to a real world frame of reference; and
   (l) updating the cutter compensation components of the data in the circular plane and the real world frame of reference.

7. In a numerically controlled machining system including a machine tool, and machine tool servo drives, apparatus for controlling said machine tool in an arbitrary plane comprising:
   (a) a digital computer;
   (b) a computer program resident in said computer;
   (c) data storage means for storing digital data;
   (d) a numerical controller processor portion of said computer for receiving data inputs from said program, and connected to said servo drives for providing control data thereto, said processor processing a block of data from said computer program to fixed format binary data and storing said fixed format binary data in a plurality of converted data buffers in said data storage means, said processor thereafter successively precalculating, from selected buffers, fixed format data that affect motion of said machine tool into an expanded form and establishing a new arbitrary plane for radius compensation of said machine tool in said arbitrary plane, and thereby producing a trajectory of motion for said machine tool;

(e) a plurality of position and velocity sensors operatively connected to said machine tool for providing feedback data therefrom; and (f) a plurality of servo drives for moving said machine tool in said arbitrary plane, said processor producing a real time data stream from said stored, precalculated data defining said arbitrary plane and said trajectory of motion, and combining with real time data stream with said feedback data to control said servo drives.

* * * * *